Figure 1:
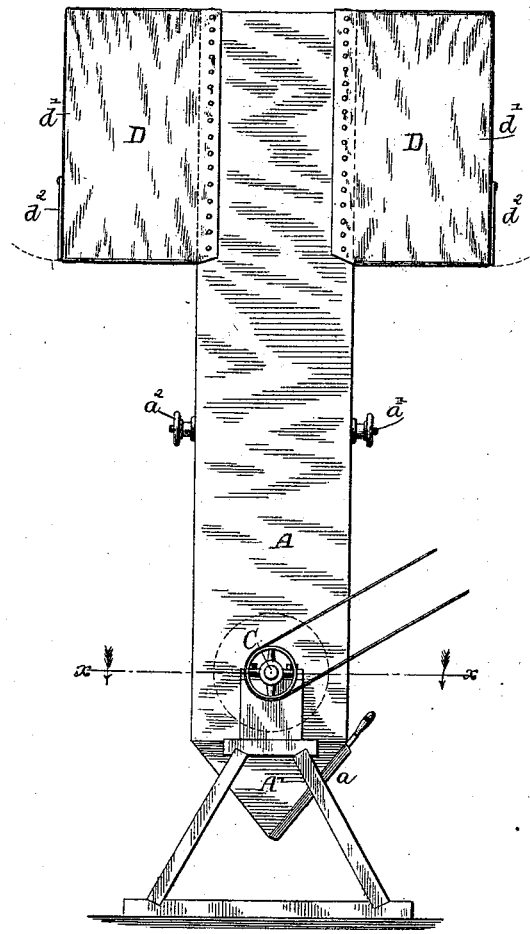

(No Model.) 2 Sheets—Sheet 1.

W. H. BURNET, J. SEARS & O. G. BURNHAM.
ART OF TREATING COTTON SEED.

No. 380,087. Patented Mar. 27, 1888.

Witnesses:
Louis M. Lockhead
Wm. F. Henning

Inventors:
William H. Burnet
Joseph Sears
Oliver G. Burnham
by Dayton & Poole
Attorneys (No Model.) 2 Sheets—Sheet 2.

W. H. BURNET, J. SEARS & O. G. BURNHAM.
ART OF TREATING COTTON SEED.

No. 380,087. Patented Mar. 27, 1888.

Witnesses:—

Inventors:—
William H. Burnet
Joseph Sears
Oliver G. Burnham
by Drayton & Poole
Attorneys

UNITED STATES PATENT OFFICE.

WILLIAM H. BURNET, JOSEPH SEARS, AND OLIVER G. BURNHAM, OF CHICAGO, ILLINOIS.

ART OF TREATING COTTON-SEED.

SPECIFICATION forming part of Letters Patent No. 380,087, dated March 27, 1888.

Application filed March 22, 1887. Serial No. 232,006. (No model.)

*To all whom it may concern:*

Be it known that we, WILLIAM H. BURNET, JOSEPH SEARS, and OLIVER G. BURNHAM, of Chicago, in the county of Cook and State of Illinois, have invented certain new and useful Improvements in the Art of Treating Cotton-Seed; and we do hereby declare that the following is a full, clear, and exact description thereof, reference being had to the accompanying drawings, and to the letters of reference marked thereon, which form a part of this specification.

This invention relates to the treatment of cotton-seed for the purpose, primarily, of separating the lint from the seed in such form that said lint shall be available for use in the arts for such purposes as it may be adapted to—as, for example, for paper-stock or fiber for use in the manufacture of paper.

Notwithstanding many attempts have heretofore been made to devise mechanical means for removing without destroying the relatively short cotton fiber or "lint" which immediately surrounds and adheres to the seed after the operations of ginning and "linting," (as linting has been heretofore performed,) no such mechanical means have been successfully operative on a practical scale, so far as we are informed.

In the manufacture of cotton-seed oil it has been the practice to break up the seed and separate the meat or inner substance thereof from the hull, leaving the lint adhering to the fragments of the hull, and such fragments of hull, with the lint adhering thereto, have practically gone to waste, though to a slight extent used as feed for cattle and as fuel, for which, however, they are not well adapted.

The method of treatment herein described, besides recovering the lint in available form for use in the arts, also results in the comminution of the hull of the seed and in the production of a meal constituted of the hull alone, or one in which the hull is present in comminuted form mixed with the comminuted meat of the seed. The mechanism shown in the accompanying drawings, and described below, includes forms of devices which we have found practicable for the recovery of the lint and adapted to the comminution of the hulls and separation of the hulls from the lint, said mechanism being here shown or referred to as illustrative merely of the general principles of the method which we have devised and herein claim.

Figure 2:
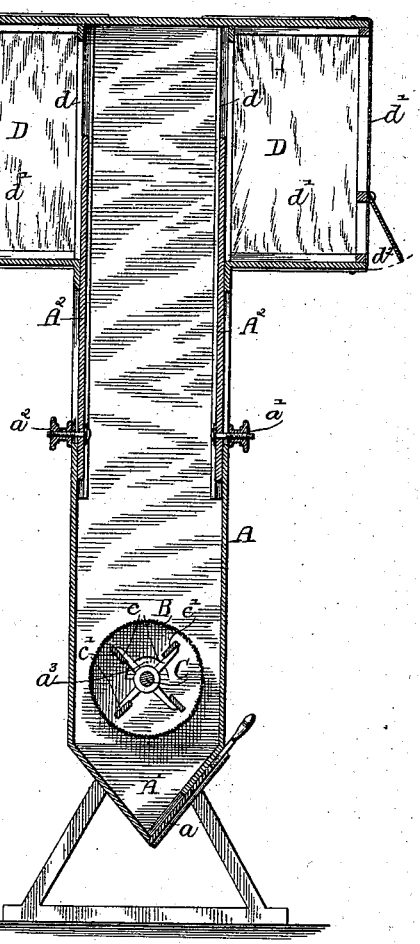
Figure 3:
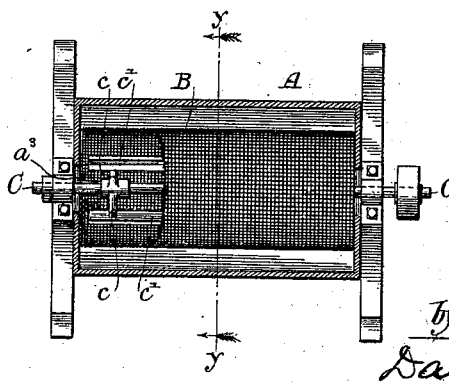

Referring to the accompanying drawings, Figure 1 is a side elevation of a disintegrating-machine which operates upon the material in the presence of an air-current. Fig. 2 is a vertical section of the machine shown in Fig. 1; and Fig. 3 is a horizontal section in the line $x\ x$ of Fig. 1, showing the cylinder partly in elevation. The remaining two figures illustrate modifications which will be particularly described farther on in this specification.

A represents a chamber or wind-trunk, which is preferably relatively narrow and high.

B is a perforated cylinder located near the bottom of the chamber A, and having its ends closed by heads, which in this instance are the walls of the chamber A.

C is a horizontal winged shaft, mounted to rotate in the cylinder B at a high speed. The shaft C has radial arms $c$, to the outer ends of which are attached blades $c'$, which blades are arranged to run at a little distance (say three-eighths or one-half an inch) from and parallel with the inner surface of the perforated cylinder B.

A' is a part of the chamber A below the cylinder B, forming a receptacle which has an opening provided with a slide, $a$, for the discharge of meal.

D is a chamber located at or in communication with the upper end of the trunk A, said chamber D being here shown as extending upon two sides of the trunk A and in communication with the interior of said trunk by passages $d$.

As here shown and as preferably constructed, the side walls of the trunk A extend a part of the way up into the chamber D, and are provided with adjustable sections or slides $A^2$, which may be slid up or down to increase or lessen the height of the wind-trunk A. These slides may be held at any desired elevation by suitable fastenings—as, for example, by hand-wheels $a'$, exterior to the walls of the trunk A and screw-threaded upon bolts $a^2$, which protrude through vertical slots in the walls of the trunk A, and which have their inner ends attached to the slides $A^2$. The outer vertical walls, $d'$, of the chamber or chambers D are of cloth, which permits the outward passage of air, but which at the same time prevents the escape of lint. Doors $d^2$ are provided at the bottom of the chamber D, by which the contents of said chamber may be removed. One head of the trunk A is provided with an opening, $a^3$, into which material to be treated may be fed directly into the interior of the perforated cylinder B. This cylinder B is desirably made of wire-cloth with about one-sixteenth to one-eighth inch mesh.

The operation of the machine above described is as follows: Whole or unbroken cotton-seed covered with lint or hulls of cotton-seed having the lint thereon are fed through the passage $a^3$ into the perforated cylinder B, in which cylinder revolves the winged shaft C at a high rate of speed. The material being treated is hurled with great force against the perforated wall of cylinder B by the centrifugal action of the rapidly-rotating beaters $c'$, and is at the same time violently rubbed upon itself and upon the uneven surface of the cylinder B, with the result of detaching the fiber and at the same time breaking up the seed or the hulls. The lint thus detached is forced through the meshes of the cylinder B, and a portion of it is carried up the wind-trunk A by the air-current produced by the rapid revolution of the wings upon the shaft C, and is deposited upon the bottom of the chamber D, while the air escapes through the cloth $d'$. In this operation the broken seed or hulls are retained in the cylinder B until they are sufficiently reduced in size to enable them also to pass through the meshes or perforations of the cylinder B, and when they thus escape, if detached from the fiber, they fall to the bottom of the chamber A. A part of the lint fibers which are carried to the chamber D will still have adhering to them small particles of the hull which happen to be broken very fine before the lint fiber has been detached therefrom. Another and a considerable part of the first product, consisting of fiber attached to fragments of hull, will fall to the bottom of the receptacle A'. The contents of said receptacle may be withdrawn and sifted by a suitable screen for the separation of the wholly-detached parts of the seed or hulls, which pass through the screen in the form of mixed meal. To separate the specks or fragments of hull which still adhere to the fibers after one operation of the beaters, said operation may be repeated once or more times until the lint is practically free from such specks. In repeating the operations the perforated cylinder B may be advantageously changed from a coarser to a finer mesh, or a series of cylinders having different sizes of mesh may be used in the succeeding operations.

The products of the treatment above described are, first, the lint or short fiber practically free from particles of the hull of the seed; second, when whole seed are treated, a meal constituted of both the meat and the hulls of the seed in ground or comminuted form, and, third, when the meats of the seed have been first removed, or removed in the operations following the first for the separation of the hull-specks from adhering fiber, a meal composed exclusively of hulls, or of the hulls and such portions of the meats as still adhere to the hulls after first breaking the seeds.

Figure 4:
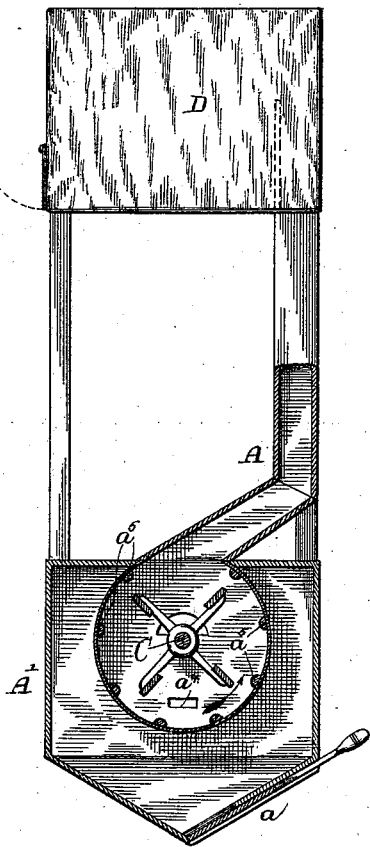
Figure 5:
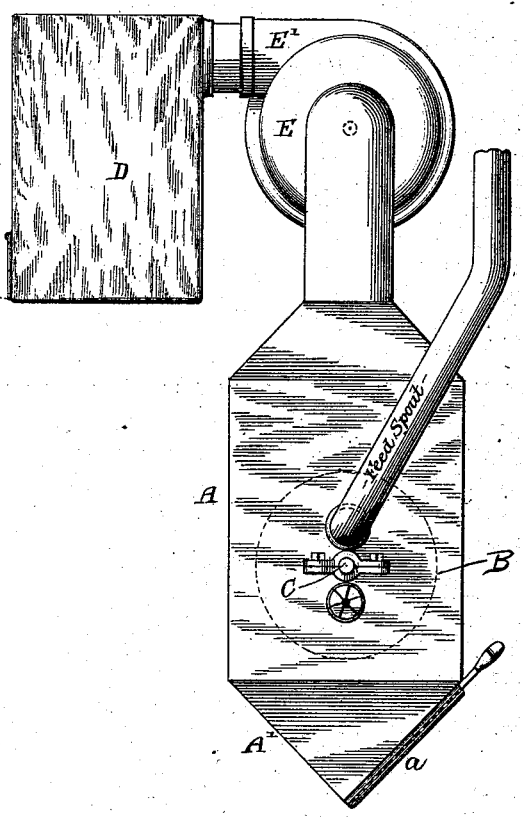

In Fig. 4 we have illustrated in partial vertical section transverse to a rotating winged shaft, C, a form of machine in which the cylinder B may be either imperforate or perforate, and in which the interior of said cylinder communicates directly with a cloth-inclosed lint-chamber, D, by a pipe or wind-trunk, A. If the cylinder B in this construction is perforate, the meal will escape therefrom into the receptacle A', as described, of the construction shown in Figs. 1, 2, and 3, and, if imperforate, a special outlet will be provided at some suitable point—as, for example, at $a^4$, through which to discharge the meal. If imperforate, also, the cylinder B should be provided with an irregular or rough inner surface, or ribs $a^5$ should be placed at intervals on such surface to produce the desired abrasion of the seed or hulls for the detachment of the fiber. The operation of this device will be essentially the same as that of the apparatus previously described—that is to say, the fiber will be detached and the seed or hulls comminuted by the violent impact caused by the movement of the wings upon shaft C, and by attrition of the seed and hull fragments upon each other and upon the rough or uneven walls of the cylinder B, while the air-current for removing the detached lint is produced by the action of the rapidly-revolving beaters by which the seed or hulls are disintegrated or broken up. Such air-current may, however, be wholly or in part produced by a separate exhaust fan or blower, and a construction of this kind is shown in Fig. 5. In said Fig. 5 we have shown a trunk, A, a perforated cylinder, B, therein, and a rotating shaft, C, which will be provided with blades $c'$ within the cylinder B, all as the corresponding parts are shown in Fig. 1. In this instance, however, the trunk A is connected at its top with the induction-opening of an exhaust fan or blower, E, and the exit-duct E' of said fan E is arranged to discharge into a chamber, D, in which the lint is collected. In the operation of this device the lint detached from the seed or hulls by the action of the beaters is drawn outwardly through the perforations of the cylinder B, and is then carried upwardly through the fan E and the duct E', and is discharged into the chamber D, in which it is deposited in the same manner as before described. We therefore do not wish to be restricted to the particular form of apparatus herein illustrated, or to apparatus having identically the same mode of operation, for the performance of our method.

The advantage of employing an air-current acting upon the seed or hulls in the place where and at the time when the lint is being detached therefrom (that is to say, in the cylinder or chamber B) is that the lint or fiber, as soon as it is detached, is carried by said current out of the cylinder and out of range of the disintegrating agencies, and is thus prevented from being further broken or shortened.

In another application for patent, Serial No. 245,319, filed July 26, 1887, and pending simultaneously herewith, is described and claimed apparatus embodying the essential principles of that herein shown, together with some improvements.

We claim as our invention—

1. The art or method of treating cotton-seed or cotton-seed hulls having the lint thereon, which consists in casting the seed or hulls forcibly against a rough or broken surface to disintegrate the seed or hulls and at the same time to detach the lint therefrom, and then removing the lint, substantially as described.

2. The art or method of treating cotton-seed or cotton-seed hulls having the lint thereon, which consists in casting the seed or hulls forcibly against a rough or broken surface to disintegrate the seed or hulls and at the same time detach the lint therefrom, and then removing the lint by an air-current, substantially as described.

In testimony that we claim the foregoing as our invention we affix our signatures in presence of two witnesses.

WILLIAM H. BURNET.
JOSEPH SEARS.
OLIVER G. BURNHAM.

Witnesses:
M. E. DAYTON,
BENJAMIN E. BREMNER.